United States Patent [19]

Seward et al.

[11] 3,973,803

[45] Aug. 10, 1976

[54] VALVE-CONTROLLED BRAKING SYSTEM FOR VEHICLES

[76] Inventors: Gerald J. Seward; Robert P. Walters, both of Box 224 R 5, Blackfoot, Idaho 83221

[22] Filed: Mar. 4, 1975

[21] Appl. No.: 555,672

Related U.S. Application Data

[63] Continuation of Ser. No. 364,825, May 29, 1973, abandoned.

[52] U.S. Cl. ................................ 303/89; 188/353
[51] Int. Cl.² ................................ B60T 17/16
[58] Field of Search ............ 303/89, 6 R, 6 A, 6 C, 303/87; 188/152, 353; 251/264; 74/504; 192/3 H

[56] References Cited
UNITED STATES PATENTS

| | | | |
|---|---|---|---|
| 1,293,976 | 2/1919 | Taylor | 251/264 |
| 1,454,397 | 5/1923 | MacDonald | 188/353 |
| 1,484,740 | 2/1924 | Rubino | 251/264 |
| 2,078,615 | 4/1937 | Simon | 74/504 |
| 2,080,603 | 5/1937 | Cometto et al. | 188/353 |
| 2,174,464 | 9/1939 | Givens | 188/152 |
| 2,227,661 | 1/1941 | Martinson | 188/353 |
| 2,466,837 | 4/1949 | Bahr | 188/353 |
| 2,675,827 | 4/1954 | Craddock | 188/152 |
| 2,877,795 | 3/1959 | Cocklin | 188/152 |

*Primary Examiner*—Duane A. Reger
*Assistant Examiner*—Galen L. Barefoot
*Attorney, Agent, or Firm*—George R. Douglas, Jr.; Anthony Cennamo; Sherman Levy

[57] ABSTRACT

A manually operable open-close valve remotely operated from the dashboard of a vehicle cooperates with the hydraulically controlled braking system of a vehicle having brakes on front and rear wheels to either block flow of hydraulic fluid to the front wheels or to permit normal flow.

1 Claim, 3 Drawing Figures

U.S. Patent  Aug. 10, 1976  3,973,803
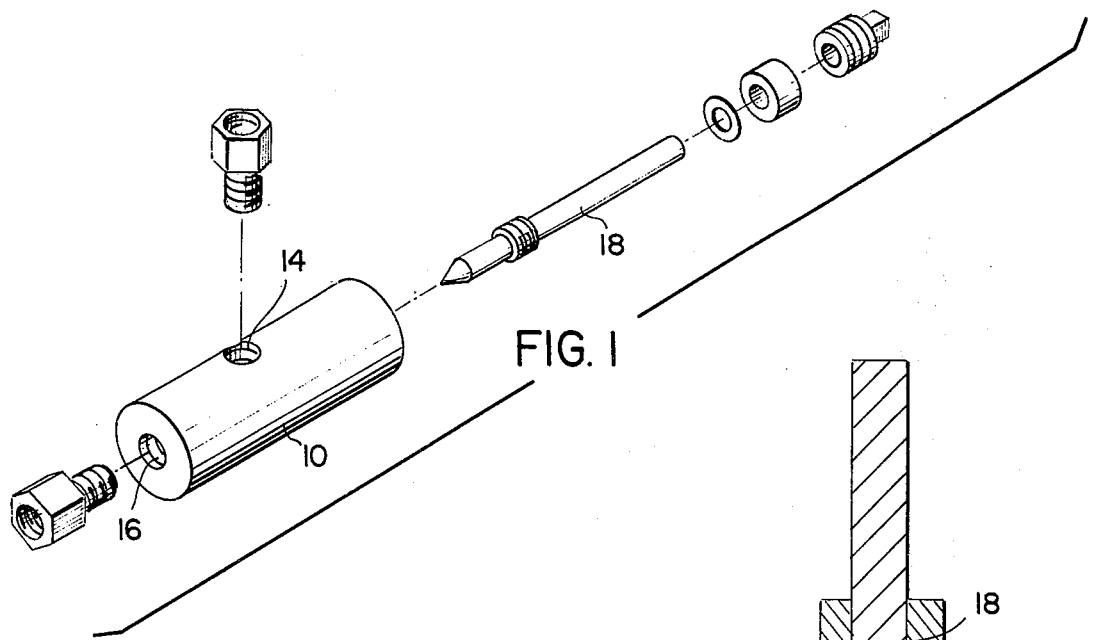
FIG. 1
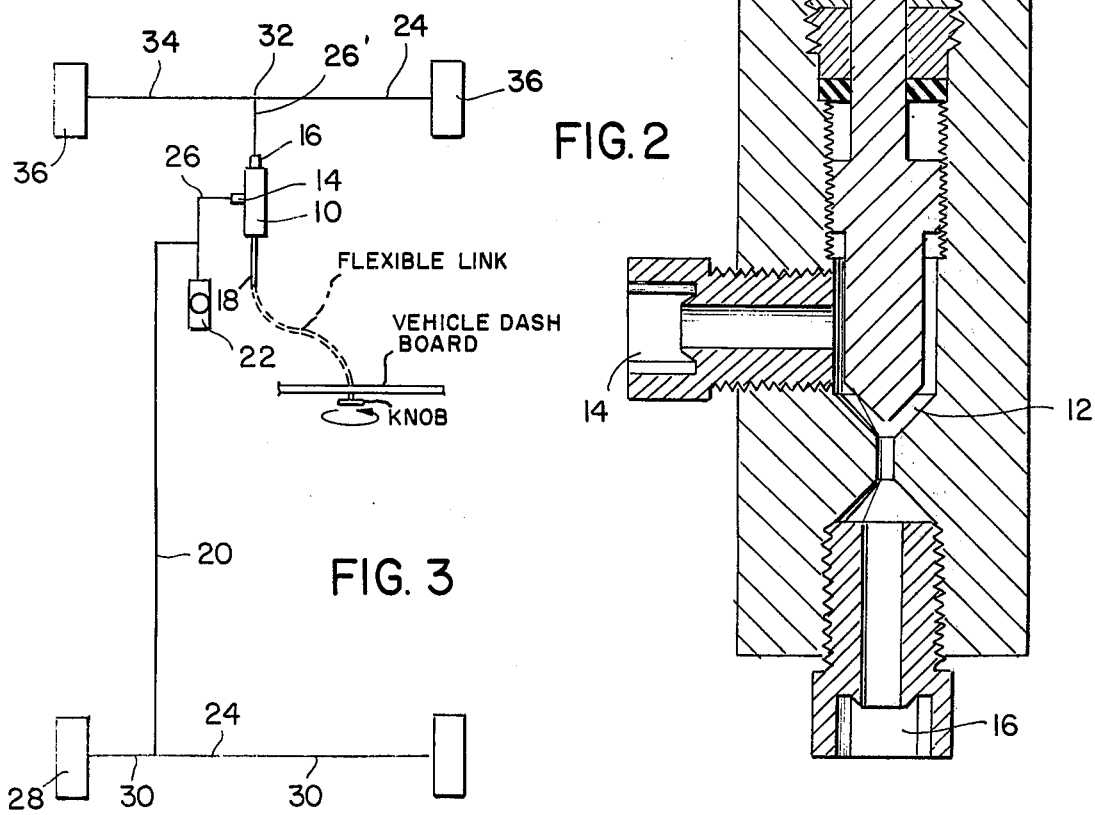
FIG. 2
FIG. 3

VALVE-CONTROLLED BRAKING SYSTEM FOR VEHICLES

CROSS REFERENCE TO RELATED APPLICATIONS AND TO PRIOR ART REFERENCES:

This application is a continuation application of our application Ser. No. 364,825 filed May 29, 1973 (now abandoned in favor of this continuation application).

This application is also an improvement over the following prior art references:

| | |
|---|---|
| MacDonald | 1,454,397 |
| Girens | 2,174,464 |
| Cocklin | 2,877,795 |
| Craddock | 2,675,827 |
| Bohr | 2,466,837 |
| Rubino | 1,484,740 |
| Taylor | 1,293,976 |

None of these several references show, teach or suggest that a dash-mounted control means for an auxilliary valve unit inserted in a hydraulic brake line system in the manner achieved with the results obtained as described herein.

BRIEF SUMMARY OF THE INVENTION

The present invention relates to an improved valve controlled braking system for motor vehicles, and more particularly the invention relates to a valve unit, manually controlled from the dash board of the vehicle, inserted within the brake line between the master cylinder and the front wheel braking system for stabilizing the brake pressure at a given brake pressure value, or at a released pressure value.

BACKGROUND OF THE INVENTION

In the conventional hydraulically operated braking system used in trucks, automobiles and other wheeled vehicles, depression of the brake pedal applies braking pressure simultaneously to front and rear wheels and release of the pedal releases this pressure simultaneously from all of such wheels.

In my invention operable open-close valve remotely operated from the dashboard of a vehicle is disposed in the hydraulic supply line in such manner as to either prevent hydraulic fluid from being applied to the front wheels (when the valve is closed) or to permit the fluid to be applied to the front wheels in conventional manner (when the valve is opened).

In use, when the valve is closed prior to application of brake pressure, the front wheels will spin freely and braking action is only effective at the rear wheels. Drivers will find this arrangement extremely useful when driving on slick or icy roads, since better control is obtained.

When the valve is closed subsequent to application of brake pressure, the front wheels are locked even after brake pressure is released. This action provides a braking assist when the vehicle is parked on a steep hill or the like.

BRIEF DESCRIPTION OF THE DRAWINGS

The above and other objects and advantages of the invention will become apparent upon full consideration of the following detailed description and accompanying drawings in which:

FIG. 1 is an exploded view of a valve used in the invention;

FIG. 2 is a cross sectional view of the valve of FIG. 1 in assembled position; and FIG. 3 is a view of a system in accordance with the invention employing the valve of FIGS. 1 and 2.

DETAILED DESCRIPTION OF PREFERRED EMBODIMENTS

Referring now to FIGS. 1–3, a valve has a hollow body 10 with chamber 12. Inlet port 14 and outlet port 16 communicate with the chamber. A shaft 18 manually rotatable about its own axis can be advanced into the chamber to seal off the liquid flow path between the ports whereby the valve is closed or can be rotated in opposite direction to withdraw the shaft from the chamber to a point at which the liquid can flow through. A first feedline 20 is connected between master cylinder 22 and a junction 24 of feedlines 30 connected to rear wheel brakes 28. A second feed line 26 is connected between cylinder 22 and port 14 of valve body 10. A continuation 26' of line 26 connects port 16 of valve body 10 to junction 32 of feedlines 34 connected to front wheel brakes 36.

A linkage such as a flexible rotatable shaft can be connected at one end to shaft 18 and at the other end to a rotatable knob on the dashboard of the vehicle whereby the valve can be opened and closed as desired for the purposes indicated.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. In combination, in a vehicle having front and rear wheels and a master hydraulic cylinder for front and rear wheel braking systems;

a first hydraulic feed line connecting said cylinder to the junction of feedlines to the individual rear wheel brakes;

a second hydraulic feed line connecting said cylinder to the junction of feedlines to the individual front wheel brakes;

a manually controlled valve having open and closed positions, and valve having a rod which is rotated in one direction to close the valve and is rotated in opposite direction to open the valve; manually operable means accesible to a driver in the interior of the vehicle for opening and closing the valve, said means including a rotatable flexible linkage connected at one end to said rod and at the other end to a rotatable knob on the dashboard of the vehicle;

means inserting said valve in the hydraulic feed path of the second line between the cylinder and the feed line junction of front wheel brakes for the hydraulic fluid to pass through to the front wheel brakes when the valve is open and fluid flow to the front wheel brakes is blocked when the valve is closed, said inserting means including that when the valve is closed before brake pressure is applied only the rear wheels can be braked and the front wheels move freely for permitting the driver of a vehicle to have enhanced control on icy or slippery road surfaces, said inserting means further including that when the valve is closed after brake pressure is applied the front wheels remain locked when other braking pressure is removed for providing a braking assist when a vehicle is parked on steep hills; and means at the dashboard of the vehicle being connected by said flexible linkage to the rod for the driver of the vehicle to remotely open and close the valve by operating the dashboard means.

* * * * *